Feb. 6, 1968  W. L. BRYAN  3,367,192
RELEASE MECHANISM
Filed Feb. 28, 1966
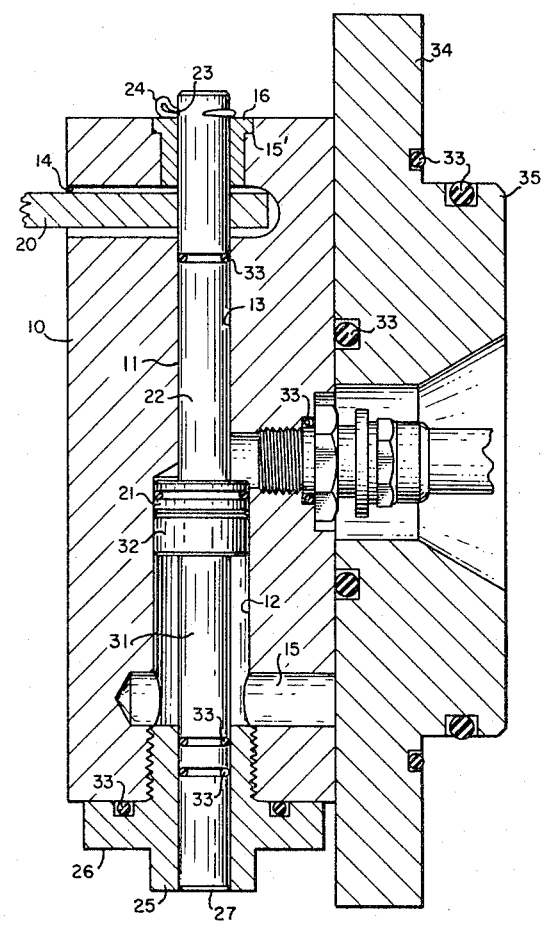
INVENTOR
WILLIAM L. BRYAN
BY *Melvin L. Crane* AGENT
*[signature]* ATTORNEY

United States Patent Office 3,367,192
Patented Feb. 6, 1968

3,367,192
RELEASE MECHANISM
William L. Bryan, 2801 5th St. SE.,
Washington, D.C. 20032
Filed Feb. 28, 1966, Ser. No. 532,535
6 Claims. (Cl. 74—2)

This invention relates to a release mechanism and more particularly to a release mechanism which is more easily operated in great depths of water as well as in air.

Heretofore, piston or plunger type release mechanisms have been provided which require a heavy-duty shear means such as a cotter pin for holding the plunger or piston in place against the hydrostatic pressure of the surrounding water in which the device is operated. Different size cotter pins being used to withstand pressures of greater depths. The requirement for a greater strength securing means requires greater pressure mechanisms to overcome the shear strength of the securing means. Thus, the greater the depth of operation, the larger the shear pin, and the greater the force of pressure required to shear the shear pin. Once the shear pin has been sheared, the hydrostatic pressure and additional pressure required to shear the shear pin, drives the piston at a fast velocity with a large force such that the piston is usually damaged in use. Thus, the piston must be replaced after each use, and also the release mechanism itself may be damaged from the large force acting upon the piston.

The present invention overcomes the disadvantages of the prior art device by providing a release mechanism in which the piston or plunger is so positioned within the release device that the hydrostatic pressure is equal on each end of the piston. Therefore the shear pin holding the plunger or piston in place must be only of sufficient size that the shear pin will hold the piston in place. Thus, the only pressure required to overcome the strength of the shear pin is that which is sufficient to shear the shear pin. Since the shear pin must be only of such size that it needs the strength only to hold the plunger in place a much smaller pressure generating device may be used to overcome the shear pin. Since a smaller pressure device may be used and the hydrostatic pressure on the piston is balanced out and there is a requirement for a much smaller pressure generating device for actuating the release mechanism regardless of the depth of operation.

It is therefore an object of the present invention to provide a shear pin release type mechanism in which a small shear pin and a small pressure for shearing the shear pin may be used regardless of depth.

Another object is to provide a release mechanism in which the operating elements of the device is not damaged during release of an object from the mechanism.

Still another object of the present invention is to provide a release mechanism which requires only a small shear pin holding means to hold the plunger of the release mechanism in place even at great hydrostatic pressures.

While still another object is to provide a release mechanism which requires a small pressure actuating device for operating the plunger of the release mechanism.

Yet another object is to provide a device in which the hydrostatic pressure on the plunger of a release mechanism is the same regardless of the depth of the release mechanism.

While still another object is to provide a shear pin-plunger type release mechanism in which the pressure on each end of the piston release mechanism is counterbalanced.

Other objects and advantages of the invention will hereinafter become more fully apparent from the following description of the annexed drawing which illustrates a preferred embodiment wherein the drawing illustrates a cross-sectional view of a preferred embodiment of the invention.

The device of the present invention is directed to a gas pressure operated plunger in which the plunger holds the object to be released in place until a desired release time. The plunger that holds the device to be released in place operates against a second plunger which extends outwardly from a housing to the outside of the device. Thus, hydrostatic pressure on the end of the plunger release and the plunger operating against the plunger release is the same. Therefore, the ambient hydrostatic pressure on the release piston is balanced out and has no effect on a holding mechanism for holding the plunger in place. Since the hydrostatic pressure is balanced out a much smaller shear pin may be used for holding the plunger in place and also a much smaller gas producing device may be used for applying a force on to the plunger for shearing the shear pin with subsequent release of the release mechanism.

Now referring to the drawing there is shown by illustration, a suitable release mechanism made in accordance with the present invention. The release mechanism includes a square, rectangular, or cylindrical housing 10 in which the housing is provided with an axially extending cylindrical passage 11 therethrough. The axially aligned passage is formed in at least two sections in which the diameter of the lower portion 12 thereof is greater than the diameter of the upper portion 13 of the passage therein. The housing is provided with a slot 14 near the upper end thereof in which the slot is normal to the axial passage 13 through the housing wherein the slot extends inwardly beyond the axial passage 13 of the housing. The bottom portion of the housing has an aperture 15 drilled normal to the axis thereof near the bottom thereof in which the aperture 15 extends beyond the axial passage 12 and is directed into the housing from the side opposite from the slot which has been cut into the top portion of the housing. That portion of the housing which extends upwardly from the slot 14 cut therein may be bored out to have a greater diameter than the axial passage in the upper portion therein and is provided with a shoulder 15' such that a bushing 16 is inserted in the upper end of the housing. The bushing 16 has an inner diameter of the same diameter as the axial passage 13 in the upper portion of the housing. The lower portion of passage 12 in the lower end of the housing is provided with threads thereon which threads extend upwardly in the passage 12 from the bottom of the housing. A piston having a piston head 21 substantially the diameter of the passage 12 in the lower portion of the body and a plunger end 22 substantially the diameter of the upper end of the passage within the body is inserted from the bottom of the housing upward into the passage 12. The piston is of such a length that when the piston head is at the upper most end of the passage 12 the plunger end 22 of the piston extends upwardly beyond the upper end of the housing. The end portion of the piston that extends beyond the upper end of the housing is provided with an aperture 23 perpendicular to the axis thereof for the purpose of receiving a shear pin 24 such as a cotter pin or any other desired type shear pin.

A plug 25 having screw threads on one end thereon and a flange 26 greater than the diameter of the screw threaded end is threaded into the threaded lower end of the housing. The plug 25 is provided with a bore 27 along the axis thereof in which the bore is substantially the same diameter as the passage 13 in the upper end of the housing. A piston or plunger 31 extends upwardly through the bore 27 in the plug and extends upwardly almost to the piston head 21 of the piston. An anvil 32 having a diameter substantially the same diameter as the piston head in the upper end of the housing is inserted between the lower piston 31 and the piston head of the upper piston. The piston head 21 and each of the plungers 22 and 31 are provided with suitable O-rings 33 to prevent any leakage between the plungers, the piston head and the walls of the axial passage. The threaded portion at the bottom end of the housing is provided with a slot along the threads for the purpose of permitting air to escape from the aperture in the housing when, at such time, the piston and the plunger is secured within the housing. A suitable O-ring 33 is provided between the flange on the plug such that there will be no leaks between the plug and the lower end of the body.

The housing is provided with an aperture approximately at the mid-point which extends inwardly normal to the axis such that a portion is at the upper end of the axial aperture 12 and the greater portion thereof meets with the lower portion of the axial aperture 13 within the housing. A squib operated high pressure gas mechanism is screw-threaded into the aperture at the mid-point of the housing and provided with an O-ring to prevent leakage. A back plate 34 having a cylindrical end 35 extending outwardly therefrom is secured to the housing by suitable bolts (not shown) that pass through the release mechanism and which screw-threads into the back plate from the opposite side of the release mechanism. A suitable O-ring 33 is positioned around the opening in the back plate through which the squib extends to prevent any leakage between the back plate and the squib mechanism. The outwardly extending cylindrical member of the back plate extends into a tubular member or pipe not shown within which the control mechanism for the squib is carried. Obviously the squib operated plunger release mechanism may be secured to any desired holding means from which the device may be operated.

In assembly of the device the suitable housing block is obtained and the axial passage made within the housing. The slot near the upper end normal to the axial passage and the aperture near the bottom portion of the housing and the screw-threaded aperture at the bottom are formed within the housing. The aperture at the bottom portion of the housing is then threaded for receipt of the plug at the bottom end of the housing. The passages through the body of the housing normal to the axis thereof which holds the back plate onto the release mechanism housing is then formed within the housing. The upper piston is then placed within the housing through the passage in the bottom of the housing with the small end of the piston extending upwardly from the upper end and the anvil mechanism is then passed within the axial passage within the bottom of the housing and then the plug is partially screwed into the housing and the lower piston is passed through the plug upwardly into the housing and extended against the anxil wherein the lower piston and anvil is forced upwardly against the upper piston. The upper piston may then be secured in place by a cotter shear pin or some other type shear pin. As the lower plunger is pressed into the housing air escapes through the slot in the lower threaded end, after the lower plunger has been pushed inwardly to the upper piston the plug 25 is then tightened. The squib mechanism is then secured to the housing normal to the axis thereof and within the screw-threaded aperture at the mid-point of the housing. The release mechanism is then ready for securing an object thereto and from which the object is released or dropped into the water from the release mechanism at any desired time.

In operation of the release mechanism the release mechanism is assembled as described above and ready for operation. If the shear pin has been placed within the piston to hold the piston in place on assembly, the shear pin is then removed and the piston forced downwardly such that the small upper end of the piston is below the slot in the upper end of the housing. The holder of the device which is to be secured to the release mechanism is then placed within the slot and the piston is then forced upwardly through the holder until the upper end of the upper plunger extends above the housing by pushing on the lower end of the piston which would be extending outwardly from the bottom portion of the holding mechanism. A suitable shear pin is then placed in the upper end of the piston to hold the piston in place.

The piston that extends upwardly through the holder that is holding the device in place bears the entire weight of the mechanism which is being held to the release device. Since both ends of the piston-plunger mechanism are exposed to ambient pressure, the shear pin need be only of a size which is sufficient to hold the piston in place. Since the shear pin need be only of a size sufficient to hold the piston in place the gas pressure squib mechanism needs to be only of such pressure that the pressure from the squib operated mechanism will be only sufficient to overcome the shear strength of the pin and to overcome the friction on the pin as applied by the weight which is being held by the piston of the holding mechanism. Since the squib is assembled onto the release mechanism at a point which is just above the piston head, the pressure will be applied onto the piston head shearing the shear pin thereby forcing the piston away from the position as held by the shear pin. The gas pressure supplied by the high pressure squib operating device moves the piston sufficiently that it will be withdrawn from the holding element to which is secured the element to be released by the release mechanism. The piston head is forced downwardly against the anvil between the lower piston and the piston head which in turn forces the anvil and piston downwardly away from the squib mechanism. As the anvil and lower piston is forced downwardly air trapped within the area below the anvil and the plug acts as a cushion to cushion the force of the anvil and the piston against the plug at the bottom of the housing. The air which is forced downwardly below the anvil is trapped within the aperture near the bottom of the housing normal to the axial passage within the housing. Since the air below the anvil acts as a cushion for the anvil and piston which is being driven downwardly by the gas pressure, there is no damage sustained by either the piston or the anvil as the piston is driven downwardly. If, however, the anvil does sustain some damage by the plug the only thing that would need to be replaced would be the anvil portion of the device. Thus, the release mechanism of the present invention not only provides the use of a much smaller shear pin mechanism which is the same size for all depths and a much smaller high pressure gas mechanism but the device is of such a nature that none of the parts are damaged by use of the described mechanism. Thus, the release mechanism is retrieved once the package has been released and is ready for another operation by only a replacement of the high pressure squib operated device. Once the device has been used to release any desired object and the squib operated high gas pressure device has been replaced the device is then ready for reloading and to carry out a desired operation in releasing another desired package.

Since both ends of the outer ends of each of the pistons are surrounded by ambient pressure the device may be used at great depths in the surrounding water or within areas desired. It will be obvious to those skilled in the art that if the mechanism is to be used at great depths in oceanic waters the housing around the axial aperture must be of such thickness and of a material that will withstand the high pressures of the oceanic waters without effecting the movement of the pistons within the mechanism. Also, it is obvious that the housing may be made as a bushing for the piston therefore if special bushing arrangements are not provided then the housing must be made of a material which will permit the piston to move freely within the aperture of the housing. In the use of the device, the best mode of operation would be with the slotted side of the release housing down with the pistons in a horizontal position such that when the object to be released is held in place by the holder means and the piston is withdrawn the object holding means will slide out through the slot downwardly away from the release mechanism. If under certain conditions the device which is being released is lying on the ground or in a position such that it will not pull away from the holding means when released then the release mechanism would then be pulled away from the device being released.

The device has been described as having two piston elements separated by an anvil and with a threaded plug secured within one end of the housing. It would be obvious to one skilled in the art that the piston may be made in two pieces or in one piece with the upper end of sufficient length to extend out of the body when the piston head is inwardly of the lower larger diameter section of the aperture through the housing and with the lower end of the piston extending outwardly from the bottom of the housing such that the both ends are subject to ambient pressures when loaded. Instead of having a screw-in plug, obviously a pressed-in plug could be used and the shoulders of the plug secured to the body of the housing by any suitable screws or bolts. If a piston is used such as herein described it is obvious that the aperture and the piston must be made with close tolerances such that the piston will operate freely within the aperture in the housing and the aperture through the plug which is secured to the bottom of the housing.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In a release mechanism including a housing with an axial aperture therein within which a piston operates a first plunger to secure an object holding means within a slot in the housing in which the slot extends across said aperture, a squib operated means for releasing gas under high pressure for producing movement of said piston within said aperture in said housing to release an object held by said object holding means, the improvement comprising:
    a plug secured in the axial aperture of said housing opposite from said piston,
    an axial aperture through said plug,
    a second plunger,
    said second plunger passing through said axial aperture in said plug having a length sufficient to extend into said aperture in said housing with the inner end operatively contacting said piston when in its uppermost position within said aperture and to extend outward through said aperture in said plug to the outside of said housing whereby,
    the outer end of each of said plungers are subjected to amibent pressure when said release mechanism is loaded and said piston and said plungers are positioned in their loaded positions.

2. In a release mechanism as claimed in claim 1, wherein:
    said plug is screw-threaded into said axial aperture within said housing.

3. In a release mechanism as claimed in claim 1, wherein:
    said piston within said housing and said plunger extend-plug is made integral with said piston within said aperture within said housing.

4. In a release mechanism as claimed in claim 1, wherein:
    said piston within said housing and said plunger extending through said aperture within said plug are provided with suitable O-rings to prevent leakage.

5. In a release mechanism as claimed in claim 1, wherein:
    said piston and said first and second plungers are made as one element in combination.

6. In a release mechanism as claimed in claim 1, which includes:
    an anvil positioned within said axial aperture in said housing between said piston and the inner end of said second plunger.

References Cited

UNITED STATES PATENTS 3,261,261   7/1966   Brown _____ 89—1.5

MILTON KAUFMAN, *Primary Examiner.*